July 11, 1944.　　　　　　　J. SAUL　　　　　　　2,353,623
FLANGE SPREADER
Original Filed Nov. 30, 1939

JOS. SAUL
INVENTOR.

BY　　Lester B. Clark.

ATTORNEY.

Patented July 11, 1944

2,353,623

UNITED STATES PATENT OFFICE 2,353,623

FLANGE SPREADER

Joseph Saul, Pasadena, Tex., assignor to Gearench Manufacturing Company, Houston, Tex., a corporation of Texas Original application November 30, 1939, Serial No. 306,808. Divided and this application June 2, 1941, Serial No. 396,265

3 Claims. (Cl. 254—100)

The invention relates to a flange spreader of a type to be used in connection with the spreading of flanges on pipelines, valve connections and similar structures.

In pipelines and various other structures where the parts are bolted together by flanged connections it is usually the practice to provide a gasket or packing between the flanges to maintain a seal. When these packings or gaskets become worn or destroyed due to pressure it is necessary to spread apart the flanges so as to insert a new packing or gasket. Often times it is difficult to obtain a sufficient amount of movement between the flanges in order to move them apart to permit the introduction of a gasket and to accomplish this the present tool has been devised with a view of providing a flange spreader which can be quickly attached and which will enable the operator to exert a sufficient force by use of the tool to spread the flanges.

Another object of the invention is to provide a flange spreader which may be readily attached and detached from the flanges.

Another object of the invention is to provide a rotatable head on the wedge spindle so that the head may be readily detached or replaced.

Other and further objects of the invention will be readily apparent when the following description is considered in connection with the accompanying drawing wherein.

In spreading flanges the general practice is to drive one or more wedges between the flanges by use of a hammer and in this manner to spread the flanges and thereafter attempt to replace or repair the gasket or packing. Such practice has been found to be dangerous however because of the fact that in working on the connection these wedges are liable to spring out of place and injure the worker. The present tool has therefore been devised which can be securely affixed to the flanges and the desired amount of spreading accomplished without danger.

Figures 1, 2:
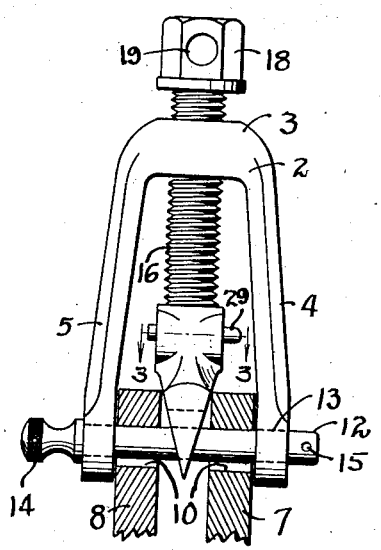
Fig. 1 is a side view of the spreader applied to a pair of flanges and illustrating the flanges as having been spread apart.
Fig. 2 is a section taken transversely and thru the frame or yoke of the spreader and illustrating the arrangement of the wedge and spindle.

The tool is seen in the side view in Fig. 1 and comprises a body, frame or yoke 2 which is made up of a base portion 3 and the arms 4 and 5 extending therefrom. These arms are arranged to straddle the flanges 7 and 8 which are to be spread apart. Flanges of this sort are usually bolted together and have the openings or bolt holes 10 therein. In the present instance the frames of the yoke 2 may be attached to the flanges by a bolt 12. This bolt is arranged to pass thru openings 13 in the ends of the arms 4 and 5 so that in this manner the tool is secured to the flanges. A head 14 on the bolt facilitates its insertion and removal. An opening 15 may receive a pin to retain the bolt in position.

In order to apply the desired force to wedge the flanges 7 and 8 apart a spindle 16 is shown as threaded at 17 thru the base 3 of the frame. This spindle has a noncircular portion 18 thereon to which a wrench or other tool may be applied in turning it or a bar may be passed thru the opening 19 therein.

Figure 3:
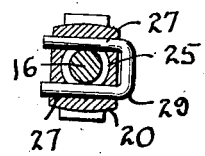
Fig. 3 is a section taken on the line 3—3 of Fig. 1 to illustrate the connection of the head to the spindle.

A wedge head 20 is positioned on the spindle and has the tapered faces 21 on the opposite sides thereof which will engage the inner faces of the flanges 7 and 8. This head has a slot 23 therein so that it may straddle the bolt 12 when it moves inwardly between the flanges. The head 20 is subjected to wear because it is this head which contacts the flanges and the head is therefore made removable as best seen in Fig. 3. The end of the spindle 16 has an annular groove 25 therein where it fits into the socket 26 of the head 20. This construction is also seen in Fig. 4. The head 20 has transverse openings 27 therethru so that a U-bolt or wire 29 may be passed thru these openings 27 and will thus engage in the groove 25 to hold the head rotatably in position. In this manner the head can be wedged in between the flanges as the spindle advances due to its rotation.

The present application is a division of the prior copending joint application of Joseph Saul, Carl E. Olsen and J. A. Peterson, Serial No. 306,808, filed Nov. 30, 1939, for a Flange spreader.

Broadly the invention contemplates a flange spreader which can be readily attached and removed from the flanges and which will facilitate spreading of the flanges without danger.

What is claimed is:

1. A flange spreader including a yoke shaped body, a spindle threaded thru the base of the yoke, a pair of spaced arms forming the sides of said yoke to straddle the flanges to be spread, means to attach said arms to the flanges, and means on said spindle to penetrate between the flanges to spread them apart as said spindle is advanced, said first means including a bolt to pass thru said flanges.

2. As a new article of manufacture, a device for spreading adjacent flanges of a pipe having aligned openings comprising in combination, a unitary body member including a central hub part and integral relatively immovable arm parts extending downwardly therefrom in spaced relation, said hub part being provided with a threaded opening extending vertically therethrough, a vertical screw in threaded engagement with said threaded opening of the hub part and having a lower end part which extends downwardly between said arm parts, for entering between and applying pressure to the said adjacent flanges, means at the upper end of said screw for rotating the same, and a rigid and unitary horizontally-extending rod having its opposite end portions associated with the lower end portions of the arm parts and having an intermediate body part for engaging in the said aligned openings of the adjacent flanges and adapted to hold said body member and flanges against relative vertical movement when said screw is moved downwardly to apply pressure against the adjacent flanges.

3. As a new article of manufacture, a device for spreading adjacent flanges of a pipe having aligned openings comprising in combination, a unitary body member including a central hub part and integral relatively immovable arm parts extending downwardly therefrom in spaced relation, said hub part being provided with a threaded opening extending vertically therethrough, a vertical screw in threaded engagement with said threaded opening of the hub part and having a lower end part which extends downwardly between said arm parts for entering between and applying pressure to the said adjacent flanges, means at the upper end of said screw for rotating the same, the lower end portions of the arm parts being provided with horizontal aligned openings therethrough, a rigid rod member having its opposite end portions extending through said openings in the arm parts and its intermediate portion being adapted to engage in the openings of the adjacent flanges so as to hold said body member and flanges against relative vertical movement when said screw is moved downwardly to apply pressure against the adjacent flanges.

JOSEPH SAUL.